United States Patent
Siddiqui et al.

(10) Patent No.: US 7,691,287 B2
(45) Date of Patent: Apr. 6, 2010

(54) METHOD FOR IMMOBILIZING LIGANDS AND ORGANOMETALLIC COMPOUNDS ON SILICA SURFACE, AND THEIR APPLICATION IN CHEMICAL MECHANICAL PLANARIZATION

(75) Inventors: Junaid Ahmed Siddiqui, Richmond, VA (US); Timothy Frederick Compton, Casa Grande, AZ (US); Robin Edward Richards, Tucson, AZ (US)

(73) Assignee: DuPont Air Products NanoMaterials LLC, Allentown, PA (US)

( * ) Notice: Subject to any disclaimer, the term of this patent is extended or adjusted under 35 U.S.C. 154(b) by 653 days.

(21) Appl. No.: 11/700,526

(22) Filed: Jan. 31, 2007

(65) Prior Publication Data
US 2008/0182485 A1    Jul. 31, 2008

(51) Int. Cl.
C09K 13/00    (2006.01)
(52) U.S. Cl. ........................... 252/79.1; 438/692
(58) Field of Classification Search .............. 252/79.1; 216/89; 438/692
See application file for complete search history.

(56) References Cited

U.S. PATENT DOCUMENTS

| | | |
|---|---|---|
| 3,252,917 A | 5/1966 | Mindick et al. |
| 3,620,978 A | 11/1971 | Moore et al. |
| 3,745,126 A | 7/1973 | Moore et al. |
| 4,732,887 A | 3/1988 | Obanawa et al. |
| 4,904,634 A | 2/1990 | Wieserman et al. |
| 5,226,930 A | 7/1993 | Sasaki |
| 5,429,708 A | 7/1995 | Linford et al. |
| 5,472,493 A | 12/1995 | Regan et al. |
| 5,767,016 A | 6/1998 | Muroyama |
| 5,876,490 A | 3/1999 | Ronay et al. |
| 5,958,288 A | 9/1999 | Mueller et al. |
| 5,993,686 A | 11/1999 | Streinz et al. |
| 6,117,220 A | 9/2000 | Kodama et al. |

(Continued)

FOREIGN PATENT DOCUMENTS

EP    1 000 995 B1    2/2003

(Continued)

OTHER PUBLICATIONS

Brian L. Mueller, et al, "Polishing Surfaces for Integrated Circuits," ChemTech, Feb. 1998, pp. 38-46.

(Continued)

*Primary Examiner*—Roberts Culbert
(74) *Attorney, Agent, or Firm*—Geoffrey L. Chase; John R. Dodd

(57) ABSTRACT

A method of polishing a substrate with a polishing composition comprising an oxidizing agent and abrasive particles having a surface, said surface of the abrasive particles being at least partially modified with 1) at least one stabilizer compound comprising aluminum, boron, tungsten, or both, said stabilizer compound being bound via a covalent bond to said abrasive particles, and 2) an organic chelating compound, said chelating compound being bound via a covalent bond to said stabilizer compound. The organic chelating compounds include one or more of 1) a nitrogen-containing moiety and between one and five other polar groups; 2) a sulfur-containing moiety and between one and five other polar groups; and 3) between two and five polar groups selected from carboxylic acid groups or salts thereof and hydroxyl groups.

12 Claims, 3 Drawing Sheets

Reaction of Chelating/Complexing Agents with Aluminum Acetate Modified Silica

A=silica particle
x=1,2,...n

U.S. PATENT DOCUMENTS

| | | |
|---|---|---|
| 6,156,661 A | 12/2000 | Small |
| 6,218,305 B1 | 4/2001 | Hosali et al. |
| 6,372,648 B1 | 4/2002 | Hall et al. |
| 6,443,811 B1 | 9/2002 | Nojo et al. |
| 6,471,735 B1 | 10/2002 | Misra et al. |
| 6,561,876 B1 | 5/2003 | Tateyama et al. |
| 6,582,623 B1 | 6/2003 | Grumbine et al. |
| 6,730,245 B2 | 5/2004 | Hampden-Smith et al. |
| 6,743,267 B2 | 6/2004 | Jernakoff et al. |
| 6,776,810 B1 | 8/2004 | Cherian et al. |
| 6,893,476 B2 | 5/2005 | Siddiqui et al. |
| 7,029,508 B2 | 4/2006 | Scott et al. |
| 7,044,836 B2 | 5/2006 | Sun et al. |
| 7,077,880 B2 | 7/2006 | Siddiqui et al. |
| 2002/0142600 A1 | 10/2002 | Jacquinot et al. |
| 2003/0017785 A1 | 1/2003 | Ueda et al. |
| 2003/0124959 A1 | 7/2003 | Schoeder et al. |
| 2003/0162398 A1 | 8/2003 | Small et al. |
| 2004/0006924 A1 | 1/2004 | Scott et al. |
| 2004/0029495 A1 | 2/2004 | Small et al. |
| 2004/0144038 A1 | 7/2004 | Siddiqui et al. |
| 2005/0076581 A1 | 4/2005 | Small et al. |
| 2005/0155296 A1 | 7/2005 | Siddiqui et al. |

FOREIGN PATENT DOCUMENTS

| | | |
|---|---|---|
| SU | 1629353 A | 2/1991 |
| WO | WO 99/53532 | 10/1999 |
| WO | WO 01/02134 | 1/2001 |

OTHER PUBLICATIONS

Howard Landis, et al, "Integration of Chemical-Mechanical Polishing into CMOS Integrated Circuit Manufacturing," Thin Solid Films, 220, 1992, pp. 1-7.

Gregory E. Shinn, et al "Chemical-Mechanical Polish," Handbook of Semiconductor Manufacturing Technology, Chapter 15, 2000, Editors: T. Nishi and R. Doering, Marcel Dekker, NYC, pp. 415-460.

Ralph K. Iler, "The Chemistry of Silica," Wiley-Interscience Publication, 1979, pp. 410-411.

Sumiko Inoue, et al, "Hydroxyl Radical Production and Human DNA Damage . . . ," Cancer Research, vol. 47, Issue 24, 1987, pp. 6522-6527.

Figure 1: Reaction of Chelating/Complexing Agents with Aluminum Acetate Modified Silica
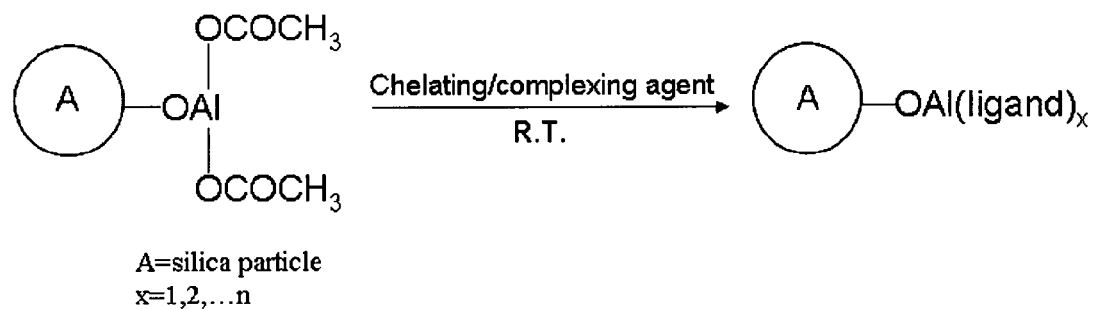
A=silica particle
x=1,2,...n
Figure 2: Mechanism of Reaction Between Chelating/Complexing Agents and Aluminum Acetate Modified Silica
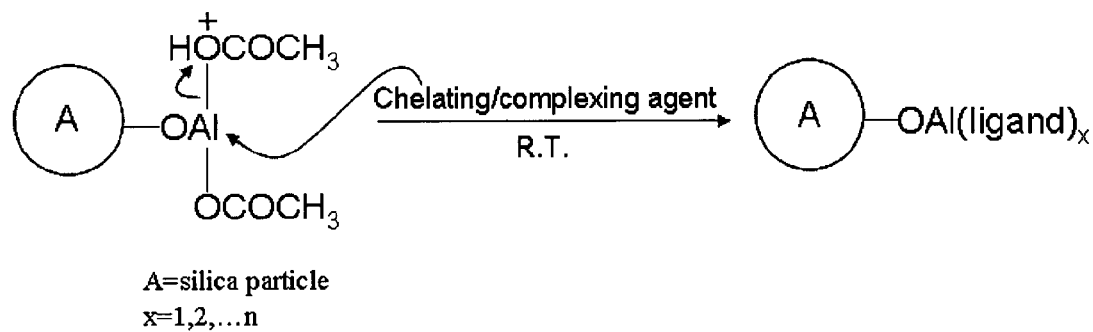
A=silica particle
x=1,2,...n Figure 3: Effect of Dilution on the Zeta Potential of Aluminum Acetate Modified Silica
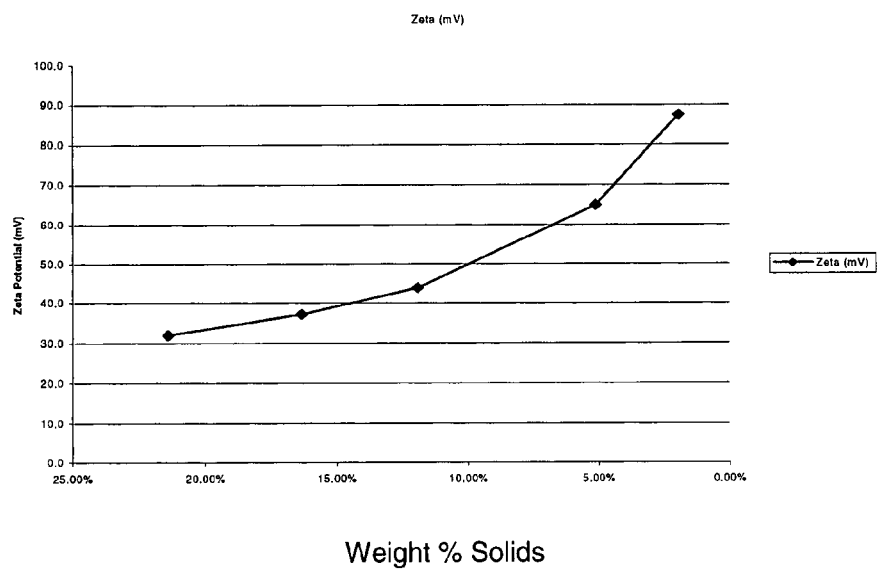
Weight % Solids
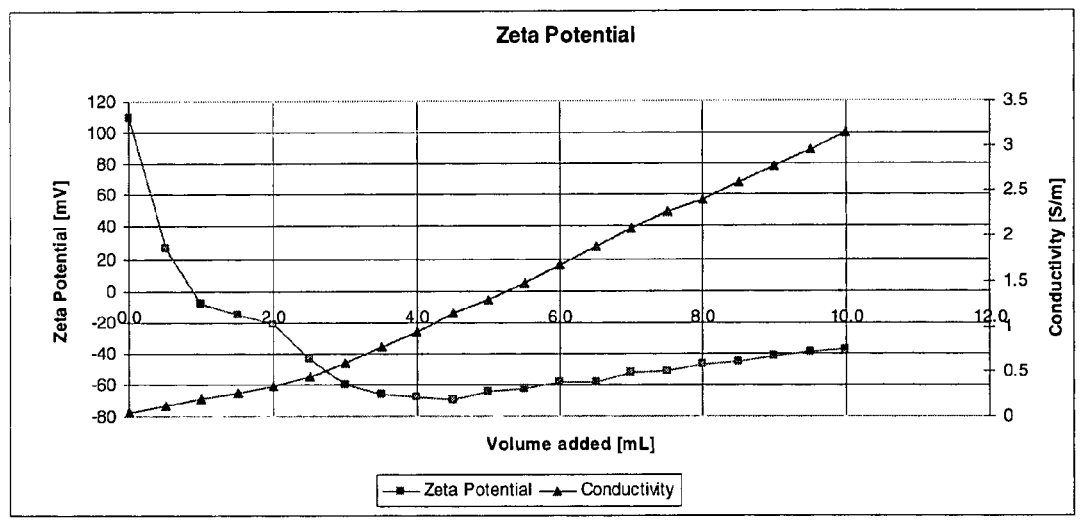
Figure 4: Reaction of Guanidine Acetate with Aluminum Acetate Modified

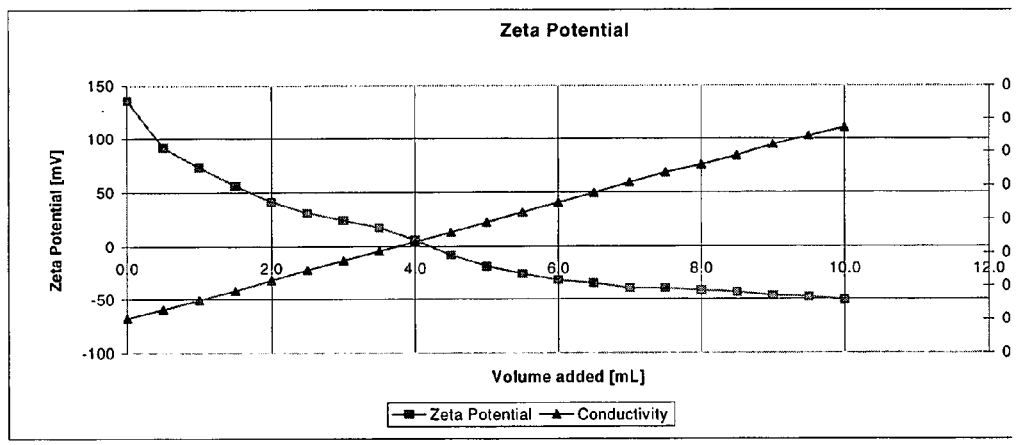
Figure, 5 : Reaction of Aluminum Acetate Modified Silica with Diethyelenetriaminepentaacetic acid (DTPA)
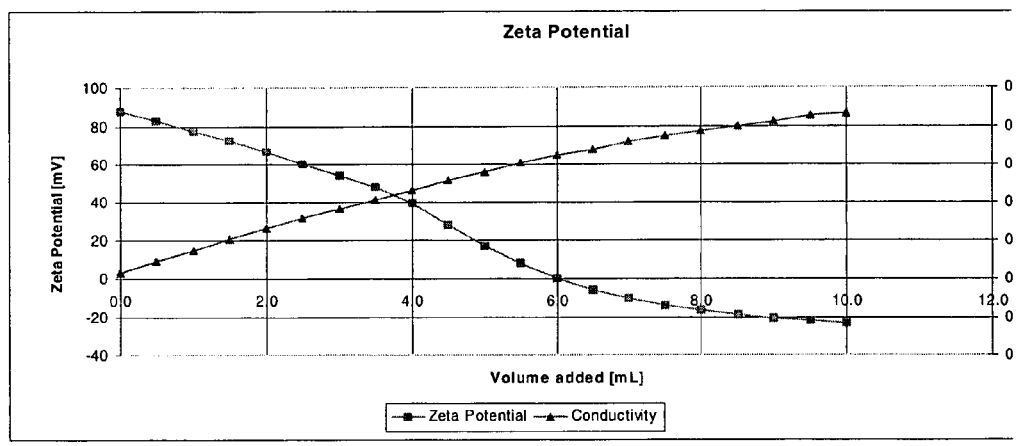
Figure, 6: Reaction of Aluminum Acetate Modified Silica with L-Lysine

METHOD FOR IMMOBILIZING LIGANDS AND ORGANOMETALLIC COMPOUNDS ON SILICA SURFACE, AND THEIR APPLICATION IN CHEMICAL MECHANICAL PLANARIZATION

BACKGROUND OF THE INVENTION

The present invention pertains to abrasive polishing compositions and associated methods of using these compositions for chemical mechanical planarization (CMP, also known as chemical mechanical polishing), wherein the slurry comprises stabilizer-surface-modified abrasive particles, for example colloidal silica surface modified with aluminum salt stabilizer, said stabilizer further having ligands bound thereto. The present invention also pertains to abrasive polishing compositions and associated methods of using these compositions for CMP wherein the slurry comprises stabilizer-organometallic compound-surface-modified abrasive particles, for example colloidal silica surface modified with aluminum salt stabilizer, said stabilizer further having ligands bound thereto, said ligands having a capacity to chelate one or more metal ions (e.g., ions comprising copper, cerium, iron, and selected other metals).

CMP for planarization of semiconductor substrates is now widely known to those skilled in the art and has been described in numerous patents and open literature publications. Some introductory references on CMP are as follows: "Polishing Surfaces for Integrated Circuits", by B. L. Mueller and J. S. Steckenrider, Chemtech, February, 1998, pp. 38-46; "Integration of Chemical-Mechanical Polishing Into CMOS Integrated Circuit Manufacturing," H. Landis et al., Thin Solids Films, 220 (1992), pages 1-7; and "Chemical-Mechanical Polish" by G. B. Shinn et al., Chapter 15, pages 415-460, in Handbook of Semiconductor Manufacturing Technology, editors: Y. Nishi and R. Doering, Marcel Dekker, New York City (2000).

In a typical CMP process, a substrate (e.g., a wafer) is placed in contact with a moving polishing pad, for example a rotating polishing pad attached to a platen. A CMP slurry, typically an abrasive and chemically reactive mixture, is supplied to the pad during CMP processing of the substrate. The abrasive may alternatively be partially or fully bound to the polishing pad. During the CMP process, the pad (typically fixed to the platen) and substrate are moved, typically by rotating both, while a wafer carrier system or polishing head applies pressure (downward force) against the substrate. The slurry or polishing liquid in combination with an abrasive polishing pad accomplishes the planarization (polishing) process by chemically and mechanically interacting with the substrate film being planarized due to the effect of the movement of the pad relative to the substrate. Polishing is continued in this manner until the desired film on the substrate is removed with the usual objective being to effectively planarize the substrate. Typically metal CMP slurries contain an abrasive material, such as silica or alumina, suspended in an oxidizing, aqueous medium.

Silicon based semiconductor devices, such as integrated circuits (ICs), typically include a dielectric layer. Multilevel circuit traces, typically formed from aluminum or an aluminum alloy or copper, are patterned onto the dielectric layer substrate. CMP processing is often employed in semiconductor manufacturing to remove excess metal at different stages. Various metals and metal alloys have been used at different stages of semiconductor manufacturing, including tungsten, aluminum, copper, tantalum, tantalum nitride, titanium, titanium nitride, ruthenium, platinum, iridium, and combinations thereof. For example, one way to fabricate a multilevel copper interconnect or planar copper circuit traces on a dielectric substrate is referred to as the damascene process. The utility of chelators in CMP has been recognized for decades. Water-soluble ligand containing organic compounds (also known as complexing agents or chelating agents) are used extensively in CMP formulations. During chemical mechanical planarization, these compounds can offer several advantages such as: a) increase metal removal rates by solubilizing abraded metal ions, b) stabilize the metal-ion-induced decomposition of hydrogen peroxide, c) can act as corrosion inhibitor to protect metal lines from galvanic corrosion, and d) reduce metal ion contamination defectivity by removing metal ions during CMP as well as during post-CMP steps.

It is known to use surface-modified abrasive in CMP. Colloidal silica, for example, has been modified with various metallic compounds as disclosed in U.S. Pat. Nos. 3,252,917, 3,620,978 and 3,745,126; commonly assigned published U.S. Patent Applications Nos. 2003/0162398, 2004/0006924, 2004/0029495, and 2005/0155296; EP Patent Publication 1 000 995; and also in the book entitled "The Chemistry of Silica", R. K. Iler, Wiley Interscience (1979), pages 410-411. Abrasives such as silica, ceria and titania have been surface-modified with boron-containing compounds such as boric acid, as disclosed in commonly assigned U.S. Pat. No. 6,743,267 (having a common inventor with this application); commonly assigned U.S. Pat. No. 6,893,476 (having a common inventor with this application); U.S. Pat. No. 5,876,490; U.S. Pat. No. 5,472,493; and U.S. Pat. No. 6,776,810. It is known to attach metal ions which promote a Fenton-type reaction directly to abrasives, as is disclosed in commonly assigned U.S. Pat. No. 7,029,508. It is known to attach metal ions which promote a Fenton-type reaction to abrasives via the use of a stabilizer containing aluminum, boron, or tungsten disposed between the abrasive and the metal ions which promote a Fenton-type reaction, as is disclosed in commonly assigned U.S. Pat. No. 7,077,880. It is also known to use ligands bound to particles in CMP, as is disclosed in commonly assigned published U.S. application 2005/0076581, where the ligands are directly bound to the abrasive or are bound by a "spacer" such as a short hydrocarbon chain. Commonly assigned application Stabilizer-Fenton's Reaction Metal-Vinyl Pyridine Polymer—Surface Modified Chemical Mechanical Planarization Composition and Associated Method describes attaching a polyvinylpyridine to a particle. Other patents of interest include U.S. Pat. No. 3,620,978; U.S. Pat. No. 5,993,686; U.S. Pat. No. 6,471,735; and commonly assigned published U.S. Patent Applications No. 2004/0144038. The disclosures of each of these references are incorporated herein by reference thereto for all permissible purposes.

In order to achieve fast tungsten or copper removal rates, the use of oxidants and co-oxidants have been reported in the CMP patent literature. For tungsten CMP, oxidants such as periodic acid, potassium iodate, ferric nitrate, and hydrogen peroxide are commonly used. For copper CMP, hydrogen peroxide and hydroxylamine are commonly used oxidants. Of all the oxidants in commercial use, hydrogen peroxide is low cost, and it is benign from the standpoint of product stewardship, as the byproduct is water. However hydrogen peroxide is a poor oxidant for tungsten as it reacts very slowly, so an additive that can increase the polishing rate of tungsten with hydrogen peroxide during CMP is typically added. There have been a number of disclosures relating to soluble metal catalysts. See, for example, U.S. Pat. No. 5,958,288, which describes the use of soluble metal co-catalysts for activating hydrogen peroxide for the planarization of tungsten. See also Patent No. SU 1629353, which discloses a composition and method for CMP of aluminum alloys, wherein soluble iron (iron chloride) is used to activate sodium perborate in the presence of diethyldithiophosphoric acid and ninhydrin. Patent Publication No. WO 99/53532 recited as one embodiment of the invention a CMP slurry comprising water, abrasive particles, and an oxidizing solution comprising a soluble peroxide, an amino acid, and one or more metals and/or compounds containing metals selected from the group consisting of chromium, cobalt, copper, iron, lead, nickel, palladium, rhodium, samarium, and scandium, with copper being preferred. This application recites that "the use of metals and/or compounds containing metals in combination with water soluble peroxide and amino acid results in the accelerated generation of hydroxyl radicals and yields a much more effective polishing composition.

While the use of soluble metal ions increases the speed at which hydrogen peroxide reacts with copper or tungsten, they also require CMP slurries with large concentrations of dissolved (ionic) metallic components. As a result, the polished substrates can become contaminated by the adsorption of charged metal ions. These species can migrate and change the electrical properties of the devices, for example at gates and contacts, and change the effective dielectric properties of dielectric layers. These changes may reduce the reliability of the integrated circuits with time. Therefore, it is desirable to expose the wafer only to high purity chemicals with very low concentrations of mobile metallic ions. Chelators used in such a polishing slurry can reduce contamination, but the chelators chelate the metal ions and generally reduce the efficacy of the soluble metal ions.

Even though there are several advantages of using complexing and chelating agents in CMP formulations in solution phase, there are several other disadvantages of using these compounds in soluble form such as: a) due to strong bonding, and high molecular mobility, these compounds can form complexes on the metal line surface, which are difficult to remove from the surface, b) chelating agents can electromigrate to bulk metal circuit and such agents are extremely difficult to remove during cleaning step, and c) chelating agents can increase etch rate, hence metal line dishing, and trenching. Another disadvantage is that the presence of chelators makes the separation and recovery of metal ions, for example the metal ions polished from the surface of the substrate, from the used slurry very difficult and costly. As a result, metals are often not recovered from this waste stream, and the waste stream must often be treated under stringent environmental guidelines which add significantly to disposal costs. The present invention is adapted to reduce or remove these disadvantages.

BRIEF SUMMARY OF THE INVENTION

In a first aspect the invention is a method for fixing and immobilizing ligand-containing organic compounds on the surface of an abrasive via chemical reaction with positively charged stabilizer-modified abrasive and their application in chemical mechanical planarization. The useful stabilizers include an acid or salt containing at least one of aluminum, tungsten, or boron, wherein the stabilizer is bound to the abrasive, preferably by a covalent bond. The ligands that can be bound to the stabilizer-modified silica abrasive include most nucleophilic ligand-containing organic compounds (chelators), but specifically exclude polyvinylpyridines (e.g., PVNO) as these compounds have been previously disclosed by us as being useful when bound to stabilized colloidal silica and the chelating capacity of these compounds is low. In a preferred method of manufacturing the stabilizer-ligand-surface-modified abrasive, the stabilizer is first bound to the abrasive and the ligand-containing organic compounds must be able to react with the surface-bound stabilizer by replacing a leaving group from the stabilizer.

A most preferred embodiment comprises A) colloidal silica as the abrasive, B) an aluminum-containing stabilizer such as aluminum acetate which is bound to at least a portion of the surface of the abrasive, and C any one or more of 1) Tricine; 2) 2-Phenylglycine; 3) Citric acid; 4) Thiosalicylic acid; 5) Diethylenetriaminepenta acetic acid; 6) Guanidine acetic acid; 7) Nitriloacetic acid; 8) L-Lysine, or the like. Other exemplary ligands expected to be bindable to an abrasive particle via this method include EDTA, ascorbic acid, adipic acid, propylenediaminetetraacetate, nitrilotriacetate, orthophthalic acid, benzonitrile, and other amino acids and amino sulfuric acids bound to the aluminum-containing stabilizer. Advantageously, the amount of stabilizer added to the surface of the silica is sufficient to result in a positive zeta potential, and the amount of ligands subsequently attached to the stabilizer is sufficient to result in a negative zeta potential.

The invention also relates to chemical mechanical polishing slurries and chemical mechanical polishing of substrates. The preferred polishing slurries of this invention are those in which most of the chelating agent in the slurry is bound, preferably via a covalent bond, to the aluminum salt or aluminate which is bound onto and which modifies at least a portion of the surface of the abrasive, which is preferably silica. This provides a mechanism whereby a well-defined amount of chelating agents which are strongly bound to particles can be delivered heterogeneously during CMP process.

BRIEF DESCRIPTION OF SEVERAL VIEWS OF THE DRAWINGS

The drawings are provided for the convenience of the reader, and they are not necessary to comprehend or use this invention.

FIGS. 1 and 2 are simplified schematics showing a nucleophilic substitution (SN2 reaction) reaction with nucleophilic organic ligands.

FIG. 3 shows the effect of dilution on the zeta potential of aluminum acetate-surface modified silica.

FIG. 4 shows the zeta potential of the aluminum acetate-surface modified silica during the addition of guanidine acetate.

FIG. 5 shows the zeta potential of the aluminum acetate-surface modified silica during the addition of DTPA.

FIG. 6 shows the zeta potential of the aluminum acetate-surface modified silica during the addition of L-Lysine.

DETAILED DESCRIPTION OF THE INVENTION

In a first aspect the invention is a method for fixing and immobilizing ligand-containing organic compounds on the surface of an abrasive via chemical reaction with positively charged stabilizer-modified abrasive and their application in chemical mechanical planarization.

The abrasives can comprise one or more of a silica, a ceria, an alumina, a titania, or a spinel. Silica is a preferred abrasive, and colloidal silica is the most preferred abrasive. Fumed silica may also be used, especially in a slurry also comprising colloidal silica. The abrasive may consist of discrete, individual particles having an average particle diameter from 5 nanometers to 5 microns, more typically 5 nanometers to 1000 nanometers, preferably 5 nanometers to 500 nanometers, more preferably from 10 nanometers to 100 nanometers. By the term "diameter" we mean the mean particle diameter as determined by the average equivalent spherical diameter when using transmission electron microscopy (TEM) image analysis, i.e., based on the area of the particles which is converted to a circle and then the diameter is determined. Generally, the particle size is not important, except that larger particles provide faster rates but higher defect levels than do smaller particles. The particles are advantageously round (spherical) or oval.

The most preferred abrasive is an aluminum-ligand-surface-modified colloidal silica having an average diameter of between 10 nanometers and about 130 nanometers, for example between about 40 nanometers and about 80 nanometers.

Advantageously at least a portion of the surface of the abrasive material has been surface-modified by a stabilizer, in particular a stabilizer that comprises Al, for example an aluminum salt or an aluminate stabilizer, and which has then subsequently undergone further surface modification by substitution of leaving groups on the stabilizer to form strong bonds, preferably covalent bonds, with ligand-containing organic compounds.

The most preferred stabilizer-ligand-surface-modified abrasive is silica that is surface-modified by an aluminum salt or aluminate and then by a source of ligand-containing nucleophilic compounds which are tightly bound to the particle, by what we believe (without being bound to theory) is a covalent bond. The covalent bond results in strong retention of the ligands on the abrasive, which in turn greatly simplifies both removing the ligands from the polished substrate and removing complexed metal from the used slurry waste stream. The strong bond and the well defined chelating capacity of the particles is an improvement over previous technologies: slurries in which chelating agents were loosely bound to particles, for example a polyacrylate molecule loosely adhering to an abrasive by electric forces. Such prior art systems provided a chelator of indeterminate capacity—it was not readily determinable how much of the polar ligands in polyacrylate was available to act in a chelating capacity versus the polar ligands which were used to hold the material to the particle versus the number of polar ligands which were sterically hindered. Further, a portion (which may be a majority) of the polyacrylate adhering to a particle prior to CMP would be dislodged from the particle during CMP, resulting in some unknown amount of soluble polyacrylate (or similar molecule including polyacrylic acids) having some chelating capacity.

The useful stabilizers include an acid or salt containing at least one of aluminum, tungsten, or boron, wherein the stabilizer is bound to the abrasive, preferably by a covalent bond. Advantageously the abrasive is silica, and at least a portion of the available surface area of the silica is modified by an aluminum salt, for example aluminum acetate where acetate stabilizes the aluminum-containing stabilizer during preparation of the particle but is eventually a leaving group, as then at least a portion of the acetate is replaced by ligand-containing organic compounds. It is recognized that this substitution reaction is driven by equilibrium, but evidence suggests that with a protonated leaving group such as acetate attached to the aluminum atom then the substitution of acetate by nucleophilic ligand-containing compounds is fairly quick and complete. With other less active leaving groups, the amount of nucleophilic ligand-containing compounds which must be added to the slurry to achieve the desired level of substitution onto the aluminum may be excessive, resulting in excess soluble nucleophilic ligand-containing compounds in the aqueous phase (unless for example washing and filtering steps are subsequently performed to reduce the amount of excess soluble nucleophilic ligand-containing compounds).

Other aluminum-containing stabilizer salts can be used, specifically including for ease of use the commercially available aluminum salts and basic aluminum salts of low molecular weight organic acid moieties such as formate, acetate, propionate, oxalate, and other low molecular weight organic anions capable of acting as a leaving group, for example having between one and three such low molecular weight organic moieties per aluminum atom. Less preferably other alkoxyaluminum compounds such as aluminum acetylacetonate, aluminum formoacetate, and even methoxyaluminum, tris-acetoxyaluminum, tris-aluminum butyrate, tris-aluminum tolylfluoroacetylacetate, tris-aluminum ethylacetoacetate, aluminum diacetylacetonato-dipivaloylmethanate, aluminum diisopropoxy(ethylacetoacetate), and the like can be used as the aluminum-containing stabilizer. An aluminum-containing stabilizer such as aluminum acetate is the preferred stabilizer, however.

More than one stabilizer can be used. Certain other stabilizers may be used in addition to or in replacement of the aluminum-containing stabilizer intermediary. Tungsten-containing stabilizers may be useful, providing the stabilizer has leaving groups. Several possible tungsten-containing stabilizer intermediaries include tungsten hexaalkoxylates, cyclopentadienyl tungsten halides, dicyclopentadienyl tungsten dihalides, tungsten amino complexes, tungsten ammonia complexes, tungsten carboxylates such as tungsten acetate or tungsten acetylacetonate, and the like. Boron-containing stabilizers may be useful, providing the stabilizer has leaving groups. For example, we have previously shown that a boron surface-modified abrasive modified with a Fenton's reaction metal (e.g., Cu or Fe) coated on the surface thereof, wherein the abrasive is further modified with low levels of a vinylpyridine polymer coated on the surface thereof, forming a boron-iron-polyvinylpyridine-surface-modified silica abrasive, are effective when used with a per-compound oxidizing agent that produces free radicals when contacted by said coated abrasive in providing equivalent tungsten removal rates and reducing iron ion contamination on the surface of wafers polished with these polishing compositions, in comparison otherwise to identical compositions without vinylpyridine polymer being present.

As previously mentioned, advantageously the abrasive particle is treated so that an aluminum atom is bound to the abrasive before introduction of the ligand. The preferred stabilizer comprises an aluminum ion which is bound (directly or through oxygen atoms) to silicon atoms in a silica substrate. Generally, the abrasive, e.g., colloidal silica, must be rigorously de-ionized prior to contacting with the aluminum stabilizer salt to obtain adequate and quantitative bonding of aluminum stabilizer salt to the abrasive. It is possible that at least one nucleophilic ligand-containing compound can be attached to an aluminum stabilizer salt prior to binding the aluminum stabilizer salt to the abrasive, but this is not a preferred method of manufacture.

The aluminum-containing stabilizer is typically added as a partially soluble salt, which are advantageously aluminum salts having protonated leaving groups. Any weak organic acid salt will work as a leaving group, and we prefer aluminum acetate because of its availability and reactivity. Our experiments always included boric acid—another known stabilizer that can bind to silica, much like aluminate or aluminum acetate. It is known that adding boric acid (or salt thereof) to deionized silica will result in borate ions being bound to the silica, much as the aluminum-containing stabilizer is bound to silica. Therefore, while we did not investigate its impact on the performance of the stabilizer in either stabilizing the particle (preventing agglomeration and settling) or of binding the nucleophilic ligand-containing compounds, each particle in our examples had both aluminum acetate stabilizer thereon and boric acid stabilizer thereon. Further, it is known that other atoms that promote polishing, for example ferric/ferrous ions and cuprous/cupric ions which can react with peroxide to form hydroxyl radicals which promote polishing, can be added to borate/boric acid-stabilized silica such as is described in co-owned U.S. Pat. No. 7,077,880. Generally, aluminum acetate does not on its own have sufficient solubility to enable a sufficient amount be added in a reasonably short period of time such that complete surface coverage of the silica is attained, and some acid is usually added to increase the solubility of the aluminum salt. Water-soluble formulations of aluminum acetate that are commercially available in a boric acid-stabilized forms $(CH_3CO_2)Al(OH)_2 \cdot X\, H_3BO_3$ and $(CH_3CO_2)_2Al(OH) \cdot X\, H_3BO_3$ which are preferred for this invention. Boric acid stabilized aluminum acetate is preferred because it is water soluble. Therefore, we recognize that on the addition of the boric-acid-stabilized aluminum acetate that a portion of the unmodified silica surfaces will be modified by the aluminum salt or aluminate, a portion of the unmodified silica surfaces will be modified by boric acid or borate, and we can not discount the possibility that some sites on the surface of the silica may be modified by both borate and by aluminum salt. It may well be that the boric acid/borate itself is bound to the silica, and the aluminum salt/aluminate is subsequently bound to the silica. Alternatively, both boric acid (borate) and aluminum salt/aluminate may be separately bound to the silica. Generally, when we describe the silica surface as being modified by aluminum salt/aluminate, this means boric acid may additionally modify some of the silica surface, and that the aluminum salt/aluminate may be bound to borate which is itself bound to the silica, or the aluminum salt/aluminate may be directly bound to silica with no borate, or any combination of the above.

Adding the aluminum salt with the boric acid is done for convenience, and the invention will work as well and possibly be even more effective at binding with greater quantities of nucleophilic ligand-containing compounds if the aluminum acetate is added without boric acid/borate being added, as we do not believe the boron-containing stabilizer is very effective at binding nucleophilic ligand-containing compounds, and the boron-containing stabilizer competes with the aluminum-containing stabilizer for available surface sites.

As previously stated, the aluminate or aluminum-containing stabilizer comprises organic leaving groups, and preferred leaving groups are low molecular weight organic acid anion moieties such as formate, acetate, propionate, and the like. Generally, an aluminum salt stabilizer bound to the surface of a silica particle can bind with at most 3 acetate groups. Reviewing the structure of aluminum salts/aluminate suggests that two of the acetate groups would be tightly bound (e.g., by a strong bond such as a covalent bond), while the third acetate group may be ionically bound. For many embodiments where it is either desirable to additionally incorporate borate as a stabilizer or if borate stabilizer is not an impediment to subsequent use, then it is preferred that the number of such leaving groups is one or two. Additionally, the low pH resulting from the addition of boric acid may make the acetate group more available to replacement by the nucleophilic ligand-containing compounds. A tris-form of the aluminum stabilizer (e.g., aluminum acetate) is also usable provided it is stable and sufficiently soluble to allow the salt to be bonded to the surface of the abrasive particle, particularly silica abrasives. Aluminum acetate can have three acetates per aluminum, and optionally boric acid can be added to this aluminum-containing stabilizer to provide solubility and stability. It is believed that boric acid will compete with the aluminum-containing stabilizer for active sites on the abrasive surface. Therefore, the relative amounts of boric acid and aluminum salts, e.g., aluminum acetate, added to deionized silica affects the total amount of aluminum-containing stabilizer available for binding with ligands. The mole ratio of aluminum-containing stabilizer to boric acid added to the deionized silica can range from infinite (no boric acid present) to about 1:20, but is preferably between about 20:1 to about 1:5, for example from about 6:1 to about 1:2. Again, boron stabilizer is not believed to be particularly effective in binding ligands, but it is useful in stabilizing the particle (preventing agglomeration of abrasive particles) and is also a useful material for adding other useful polishing adjuvants such as iron.

The more useful aluminum acetate salts, which will be reacted with the silica, is of general formula $Al[CH_3CO_2]_x(anion)_y$, where anion is any anion, for example $OH^-$, and x plus y is about 3 and x is greater than zero, for example greater than 1. Pure aluminum acetate has a very low solubility in water, and getting pure aluminum acetate into solution and then reacted with silica particles can be very time-consuming. A preferred and commercially available boric acid stabilized aluminum monoacetate (or di-basic aluminum acetate) has only acetate group and has the approximate formula $(AlCH_3CO_2(OH)_2 \cdot \frac{1}{3}H_3BO_3)$. Basic aluminum acetate can have two acetate groups, for example Bis(acetato-O) Hydroxy-Aluminum (CAS 142-03-0), which has a chemical formula: $Al(C_2H_3O_2)_2OH$ or $Al_2O(C_2H_3O_2)_4 \cdot H_2O$. When we speak of moles of aluminum-containing stabilizer or aluminum salt or aluminate we mean the formula written to contain a single aluminum atom. Typically, the boric acid stabilized aluminum di-acetate $Al(CH_3CO_2)_2(OH) \cdot X\, H_3BO_3$ has between 0.2 to about 1 mole boric acid per mole of aluminum acetate. Of course, mixtures of aluminum acetate products can be used to provide the maximum number of acetate groups consistent with sufficient solubility to allow the aluminum acetate to be dissolved in water and then reacted with the silica.

The stabilizer (e.g., aluminum acetate and optionally also borate from the boric acid if present) react with and bind to the silica. Evidence of this is shown in the zeta potential, which declines as stabilizer is added onto the surface of a silica abrasive in a slurry. The absolute amount of aluminum-containing stabilizer that can be bound to the surface of the abrasive is not unlimited. Basically, the amount of effective stabilizer (be it aluminum-containing stabilizer or the total amount of aluminum-containing stabilizer and borate stabilizer) can not effectively exceed the amount of stabilizer needed for full surface coverage of the abrasive material, where the amount required for full surface coverage is the amount where further addition of stabilizer results in no change in the zeta potential of the particles caused by the binding of stabilizer thereon (as estimated from a titration graph of amount of stabilizer added versus the zeta potential of the suspended particles). Generally, it is preferred that the surface coverage with aluminum acetate, or alternatively with aluminum acetate and with borate, on the silica is between 10% and 99+%, for example between 50% and 99%, but typically between 90% and 98% of the amount of stabilizer needed for full surface coverage of the abrasive material. Advantageously, the amount of stabilizer added to the silica abrasive is sufficient to cause the zeta potential of the silica particle to change sign, e.g., from negative to positive, before adding chelating ligands.

A useful property of aluminum acetate modified colloidal silica is that acetate group (or more generally the low molecular weight organic acid anion) is protonated under acidic conditions, so it is positively charged, and therefore can undergo a second order nucleophilic substitution (SN2 reaction) reaction with nucleophilic organic ligands. Without being bound by theory, we believe a stabilizer having leaving groups, particularly $Al(C_2H_3O_2)_2OH$ and $Al(C_2H_3O_2)(OH)_2$, binds with the silica via disruption of an OH group, where H or OH leaves to form Si—O—Al— bond between the silica and the stabilizer. Subsequently, the reaction path shown in FIGS. 1 and 2 portray a likely reaction mechanism whereby ligands are bound by a covalent bond to the stabilizer. This reaction allows immobilization of ligand containing organic compounds on the metal containing silica surface. The SN2 reaction schematic is shown in FIGS. 1 and 2. The covalent bond results in strong retention of chelating ligands on the abrasive, which in turn greatly simplifies both removing the chelator from the polished substrate after polishing and also recovering the chelated metal from the resultant waste stream. This is in sharp contrast to poly-ionic polymers which electrostatically are attracted to oppositely charged particles. Such polymers are prone to rub off and stick to the substrate being polished. Also, the layer of chelating ligands in the current invention is a monolayer or less, where the amount of bound chelator is readily controlled.

The ligands that can be bound to the stabilizer-modified silica abrasive include most nucleophilic ligand-containing organic compounds (chelators), but specifically exclude polyvinylpyridines as these compounds have been previously disclosed by us as being useful when bound to stabilized colloidal silica.

The invention therefore encompasses a composition comprising abrasive particles having a surface of one or more of silica, alumina, ceria, and a spinel; a stabilizer compound bound to said surface of the abrasive particle, said stabilizer compound containing boron (e.g., a borate), aluminum (e.g., an aluminum salt or aluminate), or tungsten (e.g., a tungstate), said stabilizer compound having a composition different than the abrasive particle; and an organic chelating compound bound to said stabilizer compound and having a capacity to chelate a metal ion in an aqueous solution. Preferably the abrasive particles comprise silica and the stabilizer compound comprises aluminum.

In a first preferred embodiment the organic chelating compound comprises a nitrogen-containing moiety and between one and five other polar groups capable of forming a complexation bond with a metal ion. This first preferred category includes traditional chelators (or salts thereof) such as ethylenediaminetetraacetic acid, diethylenetriaminopentaacetic acid, and propylenediaminetetraacetic acid, and also include amino acids or salts thereof. Examples include tricine, bicine, 2-phenylglycine, guanidine acetic acid, L-lysine, propylenediaminetetraacetic acid or salts thereof, nitrilotriacetic acid, or salts thereof.

In a second preferred embodiment the organic chelating compound comprises between two and five carboxylic acid groups or salts thereof. This second preferred category includes for example di-carboxylic acids and tricarboxylic organic acids or salts thereof such as adipic acid or oxalic acid.

In a third preferred embodiment the organic chelating compound comprises a sulfur-containing moiety and between one and five other polar groups capable of forming a complexation bond with a metal ion. An example includes thiosalicylic acid or salts thereof.

In a fourth preferred embodiment the organic chelating compound comprises between two and five polar groups selected from carboxylic acid groups or salts thereof and hydroxyl groups. Examples of this fourth preferred category include citric acid or salts thereof (which is also an example of the second preferred category), and guanidine acetic acid or salts thereof. Mentioned separately is ascorbic acid, which has properties that may make the bond to the abrasive particle be less strong than the bond holding other di-carboxylic acids and tricarboxylic acids.

In a preferred embodiment the abrasive particles are suspended in a chemical mechanical polishing slurry that also comprises water and typically at least one oxidizer such as hydrogen peroxide. Abrasive particles in such slurries are small, preferably having an average diameter between 5 and 1000 nanometers, more typically between 5 and 500 nanometers, and most advantageously for use on integrated circuits such as those comprising copper or tungsten between 20 and 200 nanometers. In a preferred embodiment the abrasive particles are silica and have bound by a covalent bond between about 0.1 moles and 1 moles of surface-bound organic chelating compound per kilogram of silica. The method of chemical mechanical polishing is well known and includes the steps of: placing a substrate having a surface to be polished in contact with a polishing pad; delivering to said surface to be polished a polishing composition comprising an oxidizing agent and abrasive particles having a surface, said surface of the abrasive particles being at least partially modified with 1) at least one stabilizer compound comprising aluminum, boron, or both, said stabilizer compound being bound via a covalent bond to said abrasive particles, and 2) a chelating compound, said chelating compound being bound via a covalent bond to said stabilizer compound; and polishing the substrate with the polishing composition.

What was surprising to us was that each nucleophilic organic ligands we tried showed evidence of undergoing the nucleophilic substitution reaction with the stabilizer bound to the abrasive. The following ligand containing chelating organic compounds (selected to represent general categories of chelators) were were bound to an aluminum-containing stabilizer-coated silica abrasive: 1) Tricine (tris-hydroxymethylglycine); 2) 2-Phenylglycine; 3) Citric acid; 4) Thiosalicylic acid ($HOOCC_6H_4SH$); 5) Diethylenetriaminopentaacetic acid (DTPA); 6) Guanidine acetic acid; 7) Nitriloacetic acid, and 8) L-Lysine. The recitation of ligands in either its acid form or as a salt form is intended to include and encompass both the acid form and all salts thereof. These ligands are not intended to be exhaustive but rather to illustrate the large number of types of ligands that can be strongly (e.g., covalently) bound to abrasive particles using the intermediary aluminum-containing stabilizer. Other exemplary ligands expected to be bindable to an abrasive particle via this method include EDTA, ascorbic acid, propylenediaminetetraacetate, nitrilotriacetate, orthophthalic acid, adipic acid, benzonitrile, and other amino acids and amino sulfuric acids.

The invention therefore includes the process of manufacturing silica particles having a stabilizer bonded to the surface thereof, for example an aluminum-containing stabilizer (e.g., an aluminate) and optionally a boron-containing stabilizer (e.g., borate) bonded to the surface thereof, where at least a portion of the a stabilizer further binds one or more ligands (e.g., ligands capable of replacing leaving groups such as acetate on an aluminum acetate stabilizer), wherein said bound ligands are capable of chelating metal ions. The proposed invention describes a simple method for immobilizing organic ligands onto positively charged abrasive particles, particularly onto silica particles and most particularly onto aluminum acetate modified silica, by means of a covalent bond. Another aspect of the invention is utilizing these organometallically modified abrasives for chemical mechanical planarization. Advantageously prior to modifying the colloidal silica the abrasive is deionized, and the preferred process of making the ligand-containing abrasive is then modifying at least a portion of the available surface area of the silica with an aluminum salt, for example aluminum acetate, and then at least a portion of the acetate is replaced by metal-ion-chelating ligands. Generally, a low pH, e.g., below about 5, can be used to make the ligands in solution replace the leaving groups on the stabilizer.

Preferably most of the chelator in the polishing composition is bound onto the aluminate, for example via a covalent bond. Generally, an aluminate atom can bind with at most 2 chelating ligands. Therefore, in a preferred embodiment, the total moles of chelator present in a slurry is less equal to or less than 4 times, preferably equal to or less than 3 times, and most preferably equal to or less than 2 times, for example between 0.3 and 1.9 times, the moles of aluminate added to the slurry, which is presumably but not necessarily entirely bonded via a covalent bond to the silica.

The invention also encompasses abrasive particles (e.g., silica) having a stabilizer bonded to the surface thereof, for example an aluminum-containing stabilizer (e.g., an aluminate) and optionally a boron-containing stabilizer (e.g., borate) bonded to the surface thereof, where at least a portion of the a stabilizer further binds one or more ligands (e.g., ligands capable of replacing leaving groups such as acetate on an aluminum acetate stabilizer), wherein said bound ligands are capable of chelating metal ions. The invention also encompasses use of such particles in chemical mechanical planarization of substrates, particularly metal-containing substrates such as copper- or tungsten-containing substrates. The stabilizer-ligand-surface-modified abrasives of this invention can be used in CMP in any slurry or composition where chelators are useful. The chelators disposed on the stabilizer-ligand-surface-modified abrasives are well positioned to immediately chelate metal ions abraded from the substrate surface, and thereby reduce surface contamination of the substrate by mobile ions. Typical CMP slurries contain an abrasive and optionally: one or more oxidizers; one or more corrosion inhibitors; one or more compounds that can tune the specific rates of removal of certain metals; one or more polishing accelerators; one or more pH adjusters; and the like. Other well known polishing slurry additives may be incorporated alone or in combination into the CMP slurry of this invention. A non-inclusive list includes agents to stabilize the oxidizer, inorganic acids, organic acids, corrosion inhibitors, soluble chelating agents, surfactants, alkyl ammonium salts or hydroxides, and dispersing agents. The oxidizer can be for example hydroxylamine, iodates, or a per compound such as a monopersulfate, a persulfate, a peroxide, a periodate, a peroxy or mixtures thereof. More preferably, the per compound oxidizing agent comprises at least one of periodic acid, hydrogen peroxide and urea-hydrogen peroxide, with hydrogen peroxide being most preferred.

It should be appreciated that only a very small amount of chelating ligands can be bound to the surface of an abrasive in a CMP slurry. In our experiments described infra, the titration data suggest we added an excess of chelator above that which could be absorbed on the stabilizer-modified silica. Generally, we have found that for 60 nanometer colloidal silica, it is possible to place between about 0.05 mole to perhaps up to 2 moles of stabilizer on a kilogram of silica, more typically about 0.2 to 0.4 moles per kilogram of silica for an aluminum-containing stabilizer and using particles of a diameter typically preferred for CMP. The amount of chelator that can be bonded to one mole of an aluminum-containing stabilizer is at most three moles chelator, and the amount of chelator that can be practically bonded to one mole of an aluminum-containing stabilizer is more usually between 0.5 moles to about 2 moles of chelator per mole of stabilizer on the silica. Therefore, the aluminum-containing stabilizer-ligand-surface modified silica (depending on particle size, number of leaving groups in the stabilizer, and a number of other factors) can usually contain between about 0.1 moles and 1 mole of surface-bound chelator per kilogram of silica. In most CMP slurries, the total amount of abrasive is between 0.5% and 5% by weight, or about 5 grams to about 50 grams of abrasive per liter. Therefore, generally in a typical CMP slurry, the moles of silica-surface-bound ligands is between about 0.0005 and about 0.05 moles per liter of slurry, and the silica-surface-bound ligands in the slurry can chelate between about 30 mg/L and 3000 mg/L of metal such as iron or copper. This is near ideal for most CMP applications. Typical CMP of semiconductors is performed under conditions that there may be between 10 and 1000 ppm, often about 100 ppm, of metal ions released from the substrate. Therefore, very little chelator is needed in CMP slurries, and it is possible to provide all the necessary chelating capacity for a CMP slurry using stabilizer-ligand-surface-modified abrasives of this invention in quantities normally used for abrasive. It is noted that each of the parameters discussed above can vary appreciably, and that typical values for typical slurries were used in the calculations.

Advantageously, the CMP slurry comprises greater chelating potential from chelators bonded to the abrasive than from chelators in solution. Various embodiments of this invention allow for a small concentration of soluble nucleophilic ligand-containing compounds (chelators) to additionally be in the aqueous carrier phase of the CMP slurry. As a practical matter, every composition having nucleophilic ligand-containing compounds-modified abrasive suspended therein must have some soluble nucleophilic ligand-containing compounds. Advantageously, at least one tenth, preferably at least one quarter, preferably for example at least one half of the total active nucleophilic ligand-containing compounds in a CMP slurry is bound to the abrasive particles. Preferably most, that is, at least 50%, for example between 60% and 99% of the chelating capacity of a CMP slurry is due to the stabilizer-ligand-surface-modified abrasives, with any remaining chelating capacity usually resulting from soluble chelators. Preferably most (by moles) of the nucleophilic ligand-containing compounds in the polishing composition are bound onto the aluminum-containing stabilizer, for example via a covalent bond directly to the aluminum-containing stabilizer. Most preferably greater than 75% of the nucleophilic ligand-containing compounds are bound to the abrasive particles. As a practical matter, this will usually be the case if there is one mole of nucleophilic ligand-containing compounds added per mole of aluminum having leaving groups such as acetate attached to the abrasive.

While generally the stabilizer-ligand-surface-modified abrasives having a chelating capacity can be used in any CMP slurry where a chelator is useful, there are a number of slurries where the use of the stabilizer-ligand-surface-modified abrasives of this invention have particular utility.

In a first embodiment the stabilizer-ligand-surface-modified abrasives having a chelating capacity can be used in slurries having between 3 ppm and 200 ppm of otherwise soluble metal ions therein. Such slurries are typically used to planarize tungsten. A well-known example is a slurry used for CMP of tungsten having between 0.5% and 10% of hydrogen peroxide and between 3 and 200 ppm of copper and/or iron ions available as a "polishing catalyst", as described in for example U.S. Pat. No. 5,958,288. When used in such a slurry as described in the first sentence of this paragraph, the otherwise-soluble metal (e.g., iron) ions will be bound to the ligands in the stabilizer-ligand-surface-modified abrasives. The activity of the iron can be reduced by the ligands. However, work in other fields suggests that a $Fe^{3+}$-nitrilotriacetate complex is a more effective catalyst in hydrogen peroxide-derived production of hydroxyl radicals than even soluble iron ions. See, e.g., *Cancer Research*, Vol 47, Issue 24 6522-6527, Hydroxyl radical production and human DNA damage induced by ferric nitrilotriacetate and hydrogen peroxide by S. Inoue and S. Kawanishi (1987). Therefore, a preferred ligand for use in such CMP slurries is a nitrilotriacetate-containing ligand.

In a second embodiment the stabilizer-ligand-surface-modified abrasives having a chelating capacity can be used in slurries having between 3 ppm and 200 ppm of metal ions (e.g., copper or iron ions) that promote a Fenton-type reaction, wherein the metals that promote this Fenton-type reaction are bound to the surface of an abrasive either directly or via an inorganic stabilizer containing boron, aluminum, or tungsten. Such slurries are described in for example U.S. Pat. No. 7,029,508. Such slurries are typically used to planarize tungsten. The iron can bind directly to the silica by displacing a hydrogen atom from an OH moiety. In such a slurry, certain ligands such as citric acid can over time (such as during shipping and storing of a slurry concentrate) strip a significant portion of the iron from the surface of the abrasive. It is therefore preferred for these slurries to use ligands that will generally not be able to strip off and chelate the copper or iron ions from the surface of the silica, but will be able to chelate tungsten ions oxidized and abraded from the surface. Such ligands include adipic acid, thiosalicylic acid, nitriloacetic acid, or L-Lysine.

In a third embodiment the stabilizer-ligand-surface-modified abrasives having a chelating capacity can be used in slurries having between 3 ppm and 200 ppm of metal ions (e.g., copper or iron ions) that promote a Fenton-type reaction, wherein the metals that promote a Fenton-type reaction are bound to a stabilizer which is itself bound to the surface of an abrasive. Such slurries are typically used to planarize tungsten. An exemplary CMP polishing composition comprises: A) a boron-stabilizer-surface-modified abrasive modified with Fenton's reaction metal ions coated on the surface thereof, e.g., a boron-iron-surface-modified silica abrasive; B) an aluminum-ligand-surface-modified abrasive; and C) a per-compound oxidizing agent that produces free radicals when contacted by said Fenton's reaction metal ions, e.g., a peroxide-type oxidizing agent, preferably hydrogen peroxide. The slurry has a fluid medium which is preferably aqueous and more preferably deionized water. The polishing slurry may further comprise a fumed silica co-abrasive which may or may not be modified with stabilizer and may or may not contain ligands bound thereto. Here, the Fenton's reaction metal ions are much more tightly bound to the abrasive, and most chelators will not strip the Fenton's reaction metal ions from the abrasive. In such a slurry, citric acid is a useful ligand to be bound to the stabilizer and thereby to the abrasive. Generally, different abrasives can be used, one to contain the metal ions promoting the Fenton-type reaction, and the second containing the stabilizer-ligands. In some embodiments, the same abrasive particle can have metal ions promoting the Fenton-type reaction, for example iron ions, bound to a stabilizer, and can also have ligands bound to the same or to a different stabilizer. A useful stabilizer in this invention is aluminum acetate stabilized with boric acid, where the boric acid also adheres and bonds to silica as a stabilizer that has an excellent affinity for iron ions.

In a fourth embodiment the stabilizer-ligand-surface-modified abrasives having a chelating capacity can be used in slurries used to polish copper/copper barrier layers. Here, bicine and/or tricine is a preferred ligand.

Having the chelators be bound to the abrasive greatly simplifies handing used (waste) slurry. The particles can be simply agglomerated as is known in the art, for example by adding appropriate electrolytes or flocculants, and the solids are recovered. Washings the recovered abrasive material having ligands bound on the surface thereof with a few volumes of aqueous acid will generally remove metals from the ligands.

EXAMPLES

Zeta potential measurements were made using a Colloidal Dynamics® instrument, manufactured by Colloidal Dynamics Corporation, 11-Knight Street, Building E8, Warwick, R.I., 02886. This instrument measures the zeta potential (surface charge) of colloidal particles, such as surface-modified colloidal silica particles.

Surface coverage of aluminum acetate-modified silica and chelating agent modified colloidal silica was measured in the following manner. During the preparation of aluminum acetate-modified colloidal silica, a very dilute solution of boric acid-stabilized aluminum acetate was added to a slurry of de-ionized silica. The colloidal silica used for the preparation of deionized silica was Syton® HT-50 (DuPont Air Products NanoMaterials L.L.C., Tempe, Ariz.), which has a negative zeta potential. The addition of aluminum acetate onto the surface of the silica changed the zeta potential of the deionized colloidal silica particle surface from a value near zero (−5 mV to +4 mV, depending upon pH) to +32 mV. This is evidence that the aluminum acetate (and boric acid or borate) was bound to the silica. After reaching the full surface coverage, there was no further change in the zeta potential of aluminum acetate modified silica on addition of additional aluminum acetate. The reaction of chelating agents with aluminum acetate modified silica was also monitored using the Colloidal Dynamics® instrument. As the reaction between chelating agent continued with aluminum acetate modified silica, zeta potential changed from a positive zeta potential value to negative zeta potential. From the plotted titration curve of measured zeta potential as a function of amount of chelating agent added to a given amount of silica during surface modification, the percentage of surface coverage of chelating agent on the surface of the surface-modified colloidal silica particles was determined to be approximately 99.9%.

As shown in FIG. 3, and Table 1 below, as the wt % solids decrease, zeta potential maintains the same charge, however the value of zeta potential increases. For example at 20 wt(weight) % solids, aluminum acetate modified silica has a zeta potential of approximately $^+$30 millivolts to +34 millivolts, and at 2 wt % solids, this modified silica has a zeta potential of approximately +85 millivolts to +90 millivolts.

| Wt % Solids | Zeta Pot. (mV) |
|---|---|
| 20% | 32.0 |
| 15% | 37.1 |
| 10% | 43.9 |
| 5% | 64.9 |
| 2% | 87.5 |

Comparative Example 1

This example describes the preparation of aluminum acetate modified colloidal silica starting with colloidal silica particles, Syton HT50®, having an average particle diameter of 40 to 55 nanometers. This step was followed in all subsequent examples.

Step 1: Approximately 3.907 kg of AMBERLITE IR-120 ion exchange resin (Rohm and Haas Company, Philadelphia, Pa.) was washed with 1 liter of 20% sulfuric acid solution. The mixture was stirred and the resin was allowed to settle. The aqueous layer was decanted and washed with 10 liters of deionized water. The mixture was again allowed to settle and then the aqueous layer was decanted. This procedure was repeated until the decanted water was colorless. This procedure afforded an acidic form of resin. SYTON™ HT 50, 22.687 kg, (50 wt % solids, 11.3 kg silica) DuPont Air Products NanoMaterials 2441 W. Erie Drive, AZ.) was placed in a 10-gallon mix tank equipped with an agitator. To the diluted Syton HT50, 10.663 kg of deionized water was added to the tank and the solution was allowed to mix for 10 minutes. The pH of the solution was measured to be approximately 10.2. With continued pH monitoring, small amounts of acid-state resin were added, while allowing the pH to stabilize in between additions. Additional resin was added in small portions until the pH had dropped to pH 1.9-2.2. Once this pH limit had been reached and was stable in this range, no further resin additions were made and the mixture was stirred for 1-1.5 hours. Subsequently, the mixture was passed through a 500-mesh screen to remove the resin and afforded deionized SYTON HT 50 colloidal silica.

Step 2: In a separate 15-gallon tank, equipped with an agitator, 10.507 kg of de-ionized water was added. To this solution, 1.284 kg of boric acid stabilized aluminum acetate powder (Fisher Scientific, 2000 Park Lane, Pittsburgh, Pa., 15275) was added slowly under agitation. After completing the addition of the boric acid stabilized aluminum acetate powder, the mixture was agitated for additional 10 minutes. The deionized and diluted SYTON HT 50 (33.32 kg) prepared in step 1 was then added to the boric acid stabilized aluminum acetate solution, prepared under step 2, slowly over about 1.2 hours at room temperature. After this addition was complete, the resulting dispersion was subsequently filtered through a 1-micron filter to afford aluminum acetate modified colloidal silica. This aluminum acetate modified colloidal silica was characterized for colloidal stability over 15 days using a Colloidal Dynamics instrument (11-Knight Street, Building E8, Warwick, R.I., 02886), and was found to exhibit both constant pH (pH approximately, 4.9 to 5.3) and zeta potential (zeta potential approximately +35 millivolts). At 2.0% solids, the zeta-potential increased to +83 millivolts. The percentage of surface sites of this surface-modified colloidal silica occupied by aluminum acetate containing compound(s) was approximately 99%.

Example 2

This example showed the preparation of guanidine acetic acid modified silica from the reaction between guanidine acetic acid and aluminum acetate modified silica. Note that the chemical name for creatine is methyl guanidine-acetic acid. In contrast, guanidine-acetic acid is glycocyamine or 2-guanidinoacetic acid having a formula weight of 117.1 g/mole. To a 250 ml beaker, 93.4 grams of de-ionized water was added, this solution was kept under agitation using a magnetic stirrer. To the de-ionized water, 6.6 grams of 30% aluminum acetate modified silica, preparation described in Example 1, was added under agitation, and mixed for additional 5 minutes. This dispersion had pH of 3.8, and zeta potential of +83 millivolts as measured using Colloidal Dynamics® instrument. Under agitation, 5 wt % guanidine acetic acid solution was added to the aluminum acetate modified silica dispersion, 100 grams, at a rate of 0.5 ml/min. and a total of 10 ml solution. During the addition of guanidine acetate solution, the zeta-potential of the mixture changed from +118 millivolts to negative −45 millivolts. This data is plotted in FIG. 4. There appears to be a point of inflection near 3 ml, corresponding to about 0.0013 moles of 2-guanidinoacetic acid added onto 2 grams of silica having ~0.0006 moles aluminate. As the concentration of guanidine acetic acid increased, conductivity of the mixture increased from 0.05 S/m to 3.2 Siemens/m (S/m).

Example 3

This example showed the preparation of DTPA modified silica from the reaction between DTPA and aluminum acetate modified silica. To a 250 ml beaker, 93.4 grams of de-ionized water was added, this solution was kept under agitation using a magnetic stirrer. To the de-ionized water, 6.6 grams of 30% aluminum acetate modified silica, preparation described in Example 1, was added under agitation, and mixed for additional 5 minutes. This dispersion had pH of 3.8, and zeta potential of +120 millivolts as measured using Colloidal Dynamics® instrument. Under agitation, 5 wt % DTPA solution (formula weight 393 g/mole) was added to the aluminum acetate modified silica dispersion, 100 grams, at a rate of 0.5 ml /min. and a total of 10 ml solution. During the addition of DTPA solution, the zeta-potential changed of the mixture changed from +120 millivolts to negative −50 millivolts. In FIG. 5, data is plotted. There appears to a very weak point of inflection near 6 ml, corresponding to 0.00076 moles of 2-guanidinoacetic acid added onto 2 grams of silica having 0.0006 moles aluminate. As the concentration of DTPA increased, conductivity of the solution increased from 0.04 S/m to 3.1 Siemens/m (S/m).

Example 4

This example showed the preparation of L-Lysine modified silica from the reaction between L-lysine and aluminum acetate modified silica. To a 250 ml beaker, 93.4 grams of de-ionized water was added, this solution was kept under agitation using a magnetic stirrer. To the de-ionized water, 6.6 grams of 30% aluminum acetate modified silica, preparation described in Example 1, was added under agitation, and mixed for additional 5 minutes. This dispersion had pH of 3.8, and zeta potential of +85 millivolts as measured using Colloidal Dynamics® instrument. Under agitation, 5 wt %

L-lysine solution (mole weight 146.2 g/mole) was added to the aluminum acetate modified silica dispersion at a rate of 0.5 ml/min. and a total of 10 ml solution. During the addition of L-lysine solution, the zeta-potential of the mixture changed from +85 millivolts to negative −20 millivolts. In FIG. 6, data is plotted. As the concentration of L-lysine increased, and the conductivity of the solution increased from 0.012 S/m to 1.2 Siemens/m (S/m).

Examples 5 to 9

These examples show: for Example 5 the preparation of tricine-modified silica from the reaction of tricine with aluminum acetate modified silica using method described in Example 2; for Example 6 the preparation of 2-phenyl glycine-modified silica from the reaction of 2-phenyl glycine with aluminum acetate modified silica using method described in Example 2; for Example 7 the preparation of citric acid-modified silica from the reaction of citric acid with aluminum acetate modified silica using method described in Example 2; for Example 8 the preparation of thiosalicylic acid-modified silica from the reaction of thiosalicylic acid with aluminum acetate modified silica using method described in Example 2; and for Example 9 the preparation of nitriloacetic acid-modified silica from the reaction of nitriloacetic acid with aluminum acetate modified silica using method described in Example 2. The data is summarized in Table 1.

Table 1 shows the results of reaction of the ligands in Examples 2-9 with aluminum Acetate Modified Silica, wherein the Zeta potential of 2% Dispersion of Aluminum Acetate Modified Silica Before Reaction was +120 millivolts.

TABLE 1

| | Ligand | Final zeta potential. mV | pH change from 5.2 to: | Particle size: (D15), NM | Particle size: (D50), NM | Particle size: (D85), NM |
|---|---|---|---|---|---|---|
| Example 2 | guanidine acetic acid | −45 | | | | |
| Example 3 | DTPA | −50 | | | | |
| Example 4 | L-lysine | −20 | | | | |
| Example 5 | Tricine | −55.4 | 8.7 | 30 | 78 | 190 |
| Example 6 | 2-Phenylglycine | −38.7 | 11.67 | 60 | 96 | 130 |
| Example 7 | Citric acid | −7.4 | 2.8 | 47 | 90 | 210 |
| Example 8 | Thiosalicylic acid | −33.9 | 11.2 | 60 | 85 | 120 |
| Example 9 | Nitriloacetic acid | −12.8 | 6.63 | 50 | 132 | 320 |

The changing of the zeta potential from positive to negative is clear evidence that the ligands became substituted or adsorbed on the silica surface. The particle size distribution remains the same as aluminum-acetate-modified silica suggesting a clean reaction without causing particle agglomeration. Selected slurry dispersions made from Examples 2-9 were tested to determine the chelating capacity of the particles, by placing an amount of the ligand-stabilizer-modified abrasive in a solution having about 20 ppm of soluble iron. After stirring and separating the solid abrasive, the resulting water was tested for the presence of iron. The results varied, but as much as 85% of the available soluble iron was removed from the aqueous phase by the ligand-stabilizer-modified abrasive.

Selected slurry dispersions made from Examples 2-9 were tested to determine the performance of the ligand-stabilizer-modified abrasive during CMP chelating capacity of the particles. Tests were performed with 5% solids mixed with 1.3% $H_2O_2$ as an oxidizer. The removal rates were similar to those obtained from similar slurries but having soluble chelators as opposed to the chelators being bound to the surface of the abrasive. It is believed that metal contamination should be lower on substrates polished using slurries of the present invention in comparison to similar slurries having soluble chelators.

The invention is intended to be illustrated but not limited by the examples described above.

The invention claimed is:

1. A composition comprising:
    abrasive particles having a surface;
    a stabilizer compound bound to said surface of the abrasive particles and comprising one or more of boron, aluminum, and tungsten, said stabilizer compound having a composition different than the abrasive particle; and
    an organic chelating compound bound to said stabilizer compound and having a capacity to chelate a metal ion in an aqueous solution;
wherein the organic chelating compound is not a polyvinylpyridine and wherein the abrasive particles comprise silica and the organic chelating compound comprises a nitrogen-containing moiety and between one and five other polar groups capable of forming a complexation bond with a metal ion.

2. The composition of claim 1 wherein the organic chelating compound comprises an amino acid or salt thereof.

3. The composition of claim 1 wherein the organic chelating compound comprises one or more of tricine, bicine, 2-phenylglycine, guanidine acetic acid, ethylenediaminetetraacetic acid or salts thereof, diethylenetriaminopenta-acetic acid, L-lysine, propylenediaminetetraacetic acid or salts thereof, nitrilotriacetic acid, or salts thereof.

4. A composition comprising:
    abrasive particles having a surface;
    a stabilizer compound bound to said surface of the abrasive particles and comprising one or more of boron, aluminum, and tungsten, said stabilizer compound having a composition different than the abrasive particle; and
    an organic chelating compound bound to said stabilizer compound and having a capacity to chelate a metal ion in an aqueous solution, wherein the organic chelating compound is not a polyvinylpyridine;
wherein the abrasive particles comprise silica and the organic chelating compound comprises between two and five carboxylic acid groups or salts thereof and wherein the organic chelating compound comprises citric acid or salts thereof.

5. A composition comprising:
    abrasive particles having a surface;

a stabilizer compound bound to said surface of the abrasive particles and comprising one or more of boron, aluminum, and tungsten, said stabilizer compound having a composition different than the abrasive particle; and an organic chelating compound bound to said stabilizer compound and having a capacity to chelate a metal ion in an aqueous solution, wherein the organic chelating compound is not a polyvinylpyridine;

wherein the abrasive particles comprise silica and the organic chelating compound comprises a sulfur-containing moiety and between one and five other polar groups capable of forming a complexation bond with a metal ion.

6. The composition of claim 5 wherein the organic chelating compound comprises thiosalicylic acid or salts thereof.

7. A composition comprising:
abrasive particles having a surface;
a stabilizer compound bound to said surface of the abrasive particles and comprising one or more of boron, aluminum, and tungsten, said stabilizer compound having a composition different than the abrasive particle; and
an organic chelating compound bound to said stabilizer compound and having a capacity to chelate a metal ion in an aqueous solution;

wherein the organic chelating compound is not a polyvinylpyridine, wherein the abrasive particles comprise silica and the organic chelating compound comprises between two and five polar groups selected from carboxylic acid groups or salts thereof and hydroxyl groups, and wherein the organic chelating compound comprises guanidine acetic acid or salts thereof.

8. A composition comprising:
abrasive particles having a surface;
a stabilizer compound bound to said surface of the abrasive particles and comprising one or more of boron, aluminum, and tungsten, said stabilizer compound having a composition different than the abrasive particle; and
an organic chelating compound bound to said stabilizer compound and having a capacity to chelate a metal ion in an aqueous solution;

wherein the organic chelating compound is not a polyvinylpyridine, wherein the abrasive particles comprise silica, the stabilizer compound comprises a salt of aluminum, and the organic chelating compound comprises: 1) a nitrogen-containing moiety and between one and five other polar groups; 2) a sulfur-containing moiety and between one and five other polar groups; or 3) between two and five polar groups selected from carboxylic acid groups or salts thereof and hydroxyl groups, and wherein said composition is a chemical mechanical polishing slurry further comprising water and an oxidizer, wherein said abrasive particles have an average diameter between 5 nanometers and 500 nanometers.

9. A composition comprising:
abrasive particles having a surface;
a stabilizer compound bound to said surface of the abrasive particles and comprising one or more of boron, aluminum, and tungsten, said stabilizer compound having a composition different than the abrasive particle; and
an organic chelating compound bound to said stabilizer compound and having a capacity to chelate a metal ion in an aqueous solution;

wherein the organic chelating compound is not a polyvinylpyridine and wherein said composition is a chemical mechanical polishing slurry further comprising water and an oxidizer, wherein said abrasive particles comprise silica and have an average diameter between 5 nanometers and 500 nanometers, wherein the stabilizer compound comprises a salt of aluminum and boric acid or salt thereof, and wherein said organic chelating compound comprises: 1) a nitrogen-containing moiety and between one and five other polar groups; 2) a sulfur-containing moiety and between one and five other polar groups; or 3) between two and five polar groups selected from carboxylic acid groups or salts thereof and hydroxyl groups.

10. A method of polishing comprising movably contacting a substrate having a metallic surface to be polished with the composition of claim 8.

11. The method of claim 10 wherein the metallic surface to be polished comprises tungsten, copper, or both.

12. A method of polishing comprising the steps of: A) placing a substrate having a surface to be polished in contact with a polishing pad; B) delivering to said surface to be polished a polishing composition comprising an oxidizing agent and abrasive particles having a surface, said surface of the abrasive particles being at least partially modified with 1) at least one stabilizer compound comprising aluminum, boron, or both, said stabilizer compound being bound via a covalent bond to said abrasive particles, and 2) a chelating compound, said chelating compound being bound via a covalent bond to said stabilizer compound; and C) polishing the substrate with the polishing composition.

* * * * *